US010027724B2

(12) United States Patent
Lindström et al.

(10) Patent No.: US 10,027,724 B2
(45) Date of Patent: Jul. 17, 2018

(54) METHODS AND APPARATUS FOR IMPLEMENTING A CONFERENCE CALL (75) Inventors: Michael Lindström, Tullinge (SE); Andreas Anulf, Lidingö (SE)

(73) Assignee: TELEFONAKTIEBOLAGET LM ERICSSON (PUBL), Stockholm (SE)

( * ) Notice: Subject to any disclaimer, the term of this patent is extended or adjusted under 35 U.S.C. 154(b) by 158 days.

(21) Appl. No.: 14/407,887

(22) PCT Filed: Jun. 15, 2012

(86) PCT No.: PCT/EP2012/061518
§ 371 (c)(1),
(2), (4) Date: Dec. 12, 2014

(87) PCT Pub. No.: WO2013/185846
PCT Pub. Date: Dec. 19, 2013

(65) Prior Publication Data
US 2015/0172333 A1 Jun. 18, 2015

(51) Int. Cl.
*H04L 29/06* (2006.01)
(52) U.S. Cl.
CPC ........ *H04L 65/403* (2013.01); *H04L 65/1016* (2013.01); *H04L 65/1063* (2013.01); *H04L 65/1069* (2013.01); *H04L 65/1096* (2013.01)
(58) Field of Classification Search
None
See application file for complete search history.

(56) References Cited

U.S. PATENT DOCUMENTS

| 2006/0053208 | A1* | 3/2006 | Laurila | H04W 4/08 709/206 |
| 2007/0263822 | A1* | 11/2007 | Chang | H04M 3/56 379/202.01 |

(Continued)

FOREIGN PATENT DOCUMENTS

| CN | 101159570 A | 4/2008 |
| CN | 102025683 A | 4/2011 |
| CN | 102469071 A | 5/2012 |

OTHER PUBLICATIONS

3rd Generation Partnership Project; Technical Specification Group Core Network and Terminals; Conference (CONF) using IP Multimedia (IM) Core Network (CN) subsystem; Protocol specification (Release 10); 3GPP TS 24.605, Sophia-Antipolis Cedex, France Dec. 19, 2010.

(Continued)

*Primary Examiner* — Chi H Pham
*Assistant Examiner* — Raul Rivas (57) ABSTRACT

According to a first aspect of the present invention there is provided a method of implementing a conference for a user of an IP Multimedia Subsystem (IMS). The method comprises, at a Telephony Application Server (TAS) that provides IMS multimedia supplementary services to the user, receiving a request for a conference from the user, designating a Public User Identity (PUI) of the user as an identifier for a conference service provided by the TAS that is to host the conference for the user, receiving signalling relating to a call intended for the user, and using the designated PUI to determine if the call can be connected to a conference hosted by the TAS for the user.

9 Claims, 5 Drawing Sheets (56) References Cited

U.S. PATENT DOCUMENTS

| | | | | |
|---|---|---|---|---|
| 2008/0004061 A1* | 1/2008 | Takeda | ............... | H04L 67/306 |
| | | | | 455/518 |
| 2008/0125096 A1* | 5/2008 | Aaltonen | ............ | H04W 12/08 |
| | | | | 455/412.2 |
| 2008/0181140 A1* | 7/2008 | Bangor | ............... | H04L 65/403 |
| | | | | 370/261 |
| 2013/0283160 A1* | 10/2013 | Ball | .................. | H04L 65/605 |
| | | | | 715/716 |

OTHER PUBLICATIONS

3GPP TS 24.147 V8.4.0 (Dec. 2011) 3rd Generation Partnership Project; Technical Specification Group Core Network and Terminals; Conferencing using the IP Multimedia (IM) Core Network (CN) subsystem; Stage 3 (Release 8); chapters 5.3.1 and 5.3.2.
3GPP TS 23.228 V2.0.0 (Mar. 2001); 3rd Generation Partnership Project; Technical Specification Group Services and System Aspects; IP Multimedia (IM) Subsystem—Stage 2; chapter 4.3.6.
3GPP TS 23.003 V10.5.0 (Mar. 2012) 3rd Generation Partnership Project; Technical Specification Group Core Network and Terminals; Numbering, addressing and identification (Release 10); chapters 13.4 and 13.5.
Rosenberg, J.; IETF RFC 4353—A Framework for Conferencing with the Session Initiation Protocol (SIP); Network Working Group; Feb. 2006; chapter 3.1.

\* cited by examiner

METHODS AND APPARATUS FOR IMPLEMENTING A CONFERENCE CALL

This application is a 371 of PCT/EP2012/061518, filed Jun. 15, 2012, the disclosure of which is fully incorporated herein by reference.

TECHNICAL FIELD

The present invention relates to methods and apparatus for implementing a conference call for a user of an IP Multimedia Subsystem (IMS).

BACKGROUND

The IP Multimedia Subsystem (IMS) is the technology defined by the Third Generation Partnership Project (3GPP) to provide IP Multimedia services over telecommunication networks (see 3GPP TS 22.228, TS 23.228, TS 24.229, TS 29.228, TS 29.229, TS 29.328 and TS 29.329). IMS provides key features to enrich the end-user person-to-person communication experience through the integration and interaction of services. IMS allows new rich person-to-person (client-to-client) as well as person-to-content (client-to-server) communications over an IP-based network. The IMS is able to connect to both PSTN/ISDN (Public Switched Telephone Network/Integrated Services Digital Network) as well as the Internet.

Figure 1:
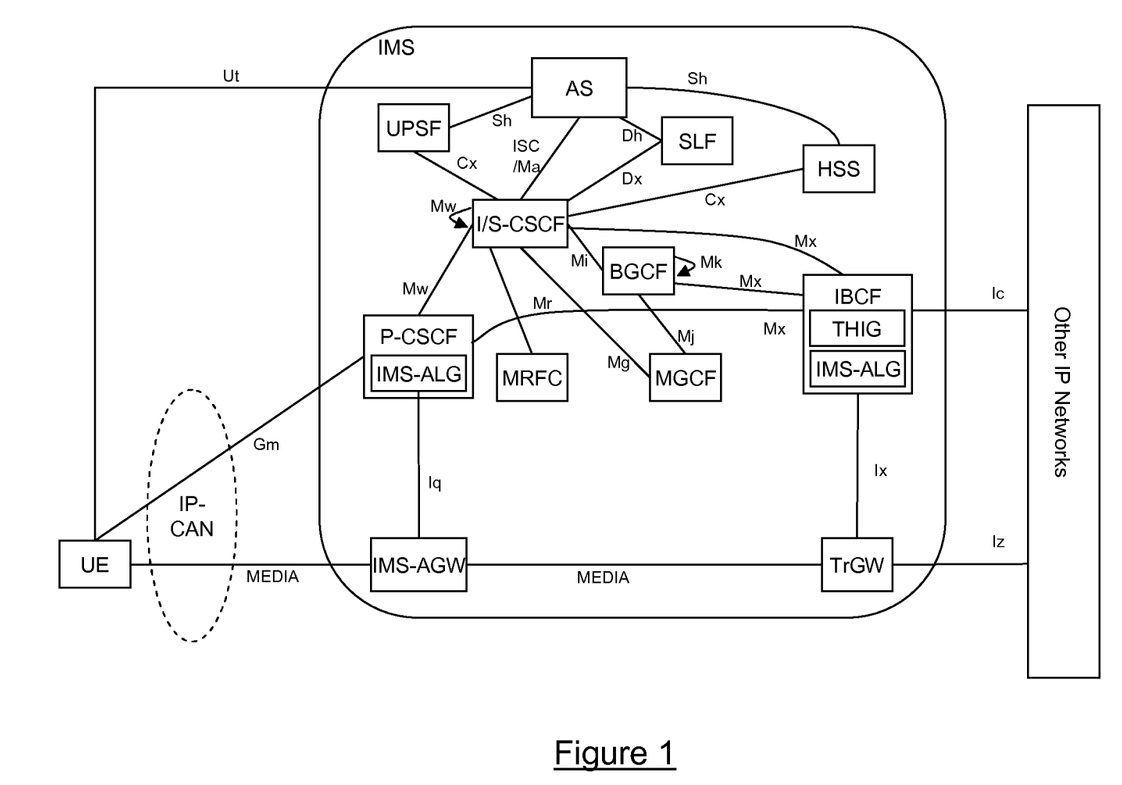
FIG. 1 illustrates schematically the architecture for the IMS and its relationship to an IP-Connectivity Access Network (IP-CAN)

FIG. 1 illustrates schematically the architecture for the IMS and its relationship to an IP-Connectivity Access Network (IP-CAN). In the IMS, Call/Session Control Functions (CSCFs) operate as SIP proxies, and interface with other entities such as Border Gateway Control Functions (BGCFs) and Media Resource Function Controllers (MRFCs) amongst others. The 3GPP architecture defines three types of CSCFs: a Proxy CSCF (P-CSCF) is the first point of contact within the IMS for a User Equipment; a Serving CSCF (S-CSCF) provides services to a subscriber; and an Interrogating CSCF (I-CSCF) identifies the correct S-CSCF and forwards to that S-CSCF a request received from a User Equipment via a P-CSCF. In this regard, a User Equipment may be any device, mobile or stationary, enabled to communicate by radio or any other means with the IMS via an IP-CAN, for instance but not limited to e.g. mobile phone, smart phone, sensors, meters, vehicles, household appliances, medical appliances, media players, cameras, or any type of consumer electronic device, for instance but not limited to television, radio, lighting arrangements, tablet computer, laptop, or PC.

Within the IMS service network, Application Servers (ASs) are provided for implementing IMS service functionality. Application Servers provide services to end users in an IMS system, and may be connected either as end-points over the 3GPP defined Ma interface, or "linked in" by an S-CSCF over the 3GPP defined ISC interface. In the latter case, Initial Filter Criteria (IFC) are used by an S-CSCF to determine which Applications Servers should be "linked in" during a SIP Session establishment (or indeed for the purpose of any SIP method, session or non-session related). The IFCs are received by the S-CSCF from an HSS during the IMS registration procedure as part of a user's Subscriber Profile.

3GPP also defines a number of supplementary services that are supported by IMS. For example, the standardized supplementary services supported by IMS include but are not limited to Originating Identification Presentation (OIP), Originating Identification Restriction (OIR), Terminating Identification Presentation (TIP), Terminating Identification Restriction (TIR), Communication Diversion (CDIV), Communication Hold (HOLD), Communication Barring (CB), Message Waiting Indication (MWI), Conference (CONF), Advice Of Charge (AOC), Communication Waiting (CW), Flexible Alerting, Customized Alerting Tones (CAT), and Customized Ringing Signal (CRS). In addition to the standardized supplementary services, the vendor of an IMS Application Server can configure an Application Server so as to implement additional, vendor specific services. An example of such a vendor specific service is the Flexible Communication Distribution service.

The CONFerence (CONF) service enables a user to participate in and control a simultaneous communication involving a number of users. The applicable 3GPP Technical Specifications detail the procedures that allow a user to create and participate in a conference. For example, to create a conference, a user's UE can generate an initial SIP INVITE request and set the request URI (Uniform Resource Identifier) of the INVITE request to a conference factory URI that will cause the INVITE to be routed to a specific conferencing AS. If the conferencing AS determines that it can host a conference for the user (e.g. if the user is authorised/verified), then the conferencing AS will allocate a conference URI as an identifier for the conference, and return this conference URI to the user. In order to invite other user's to join the conference, the UE can then either send a REFER request to the user directly, with the Refer-To header of the REFER request set to a conference URI of the conference, or can send a REFER request to the conferencing AS, with the Refer-To header of the REFER request set to the SIP URI or tel URI of the user who is invited to the conference. As an alternative example, in order to create a conference, a UE can generate a SIP INVITE request that is sent to the conferencing AS using the conference factory URI, and can attach a message body to the request that includes a URI list that identifies the other users that are to be invited to the conference.

Upon receipt of either a REFER request that requests that other users are invited to a conference or an INVITE request that creates a conference and includes a list of other users that are to be invited to the conference, the conferencing AS can invite users to the conference by sending either an INVITE request or a REFER request to the invited user(s), the request including the conference URI of the conference. Following receipt of either an INVITE request or a REFER request from the conferencing AS at the UE of an invited user, the invited user can then decide whether or not to accept the invitation and join the conference. In order to join the conference, the UE of the invited user can then generate and send an INVITE request with the request URI of the INVITE request set to the conference URI received from the conferencing AS in the INVITE request or REFER request.

It has been recognised here that the conventional conference service described above require that all of the users that wish to participate in a conference must do so by contacting the same dedicated conferencing AS, using either a conference factory URI of the conferencing AS or a conference URI allocated to a conference instance by the conferencing AS, and that such a solution therefore suffers from capacity limitations, and does not scale well when implemented in large systems such as in residential or enterprise environments. In particular, the capacity of a single conferencing AS will be limited in terms of the number of simultaneous traffic sessions that can be supported as well as the number of conferences that can be scheduled. Whilst it is possible to circumvent this problem by making use of several different conferencing ASs within a system, with each conferencing AS serving a subset of the users of the system, this means that different users will be assigned different conference factory URIs for use when requesting a conference service.

SUMMARY

It is an object of the present invention to provide methods and apparatus for implementing scheduled conferences that overcomes, or at least mitigates the problems identified above.

According to a first aspect of the present invention there is provided a method of implementing a conference for a user of an IP Multimedia Subsystem (IMS). The method comprises, at a Telephony Application Server (TAS) that provides IMS multimedia supplementary services to the user:

receiving a request for a conference from the user;
designating a Public User Identity (PUI) of the user as an identifier for a conference service provided by the TAS that is to host the conference for the user;
receiving signalling relating to a call intended for the user; and using the designated PUI to determine if the call can be connected to a conference hosted by the TAS.

The method may further comprise establishing supplementary service rules, one or more of the supplementary service rules including conditions that relate to the conference, and using the supplementary service rules to determine if any supplementary services supported by the TAS should be applied to the call.

The method may further comprise transmitting a response to the user that includes the designated PUI.

The step of using the designated PUI to determine if the call can be connected to a conference hosted by the TAS for the user may comprise determining if the call is directed to the designated PUI. If it is determined that the call cannot be connected to the conference, then the method may further comprise determining if any supplementary services supported by the TAS should be applied to the call.

The method may further comprise communicating with the user in order to establish one or more conference rules that are to be used to determine if a call directed to the designated PUI should be connected to the conference. The step of using the designated PUI to determine if the call can be connected to a conference hosted by the TAS for the user may then further comprise, if the call is directed to the designated PUI, determining if the call matches at least one of the conference rules. If it is determined that the call does not match at least one of the conference rules, then the method may further comprise determining that the call cannot be connected to the conference, and determining if any supplementary services supported by the TAS should be applied to the call.

The step of designating a PUI of the user as an identifier for the conference service may comprise receiving instructions from the user that specify a PUI of the user that is to be used to identify the conference. Alternatively, the step of designating a PUI of the user as an identifier for the conference service may comprise designating a PUI of the user that is included in the received request for a conference as the identifier for the conference. As a further alternative, the step of designating a PUI of the user as an identifier for the conference service may comprise identifying a PUI of the user that has been pre-configured as the designated PUI of the user.

According to a second aspect of the present invention there is provided method of operating an IP Multimedia Subsystem (IMS) User Equipment (UE) in order to implement a conference for a user of the IMS. The method comprises:

sending a request for a conference to a Telephony Application Server (TAS) that provides IMS multimedia telephony and supplementary services to the user; and
receiving a response from the TAS, the response including a Public User Identity (PUI) of the user that has been designated as an identifier for a conference service provided by the TAS that is to host the conference.

The method may further comprise communicating with the TAS in order to establish one or more conference rules that are to be used to determine if a call directed to the PUI of the user that has been designated as an identifier for the conference service should be connected to the conference hosted by the TAS.

The method may further comprise sending instructions to the TAS that specify the PUI of the user that is to be designated as an identifier for the conference service.

The method may further comprise initiating a call directed to the designated PUI in order to join the conference. Alternatively, the method may further comprise initiating a call directed to a short number or supplementary service code that the TAS will interpret as a request to join the conference hosted by the TAS for the user.

According to a third aspect of the present invention there is provided an apparatus configured to operate as an IP Multimedia Subsystem (IMS) Telephony Application Server (TAS) that provides IMS supplementary services to a user. The apparatus comprises:

a receiver configured to receive a request for a conference from the user;
a processor configured to designate a Public User Identity (PUI) of the user as an identifier for a conference service provided by the TAS that is to host the conference for the user;
the receiver being further configured to receive signalling relating to a call intended for the user; and
the processor being further configured to use the designated PUI to determine if the call can be connected to the conference hosted by the TAS for the user.

The processor may be configured to establish supplementary service rules, wherein one or more of the supplementary service rules include conditions that relate to the conference, and to use the supplementary service rules to determine if any supplementary services supported by the TAS should be applied to the call.

The processor may be configured to generate a response to the user that includes the designated PUI, and the apparatus may further comprise a transmitter configured to send the response to the user.

The processor may be configured to determine if the call can be connected to a conference hosted by the TAS for the user by determining if the call is directed to the designated PUI. If it is determined that the call cannot be connected to the conference, the processor may be configured to determine if any supplementary services supported by the TAS should be applied to the call.

The processor may be configured to communicate with the user in order to establish one or more conference rules that are to be used to determine if a call directed to the designated PUI should be connected to the conference. Then, if the call is directed to the designated PUI, the processor may be configured to use the one or more conference rules to determine if the call should be connected to the conference. The processor may be configured to use the one or more conference rules to determine if the call should be connected to the conference by determining if the call matches at least one of the conference rules. Then, if it is determined that the call does not match at least one of the conference rules, the processor may be configured to determine that the call cannot be connected to the conference, and to determine if any supplementary services supported by the TAS should be applied to the call.

The processor may be configured to designate a PUI of the user as an identifier for the conference service in accordance with instructions from the user that specify the designated PUI of the user that is to be used to identify the conference. Alternatively, the processor may be configured to designate a PUI of the user that is included in the received request for a conference as the identifier for the conference service. As a further alternative, the processor may be configured to designate a PUI of the user as an identifier for the conference service by identifying a PUI of the user that has been pre-configured as the designated PUI of the user.

According to a fourth aspect of the present invention there is provided an apparatus configured to operate as an IP Multimedia Subsystem (IMS) User Equipment (UE). The apparatus comprises:

a processor configured to generate a request for a conference;

a transmitter configured to send the request for a conference to a Telephony Application Server (TAS) that provides IMS multimedia telephony and supplementary services to a user of the UE; and a receiver configure to receive a response from the TAS that includes a Public User Identity (PUI) of the user that has been designated as an identifier for a conference service provided by the TAS that is to host the conference.

The processor may be configured to obtain the PUI of the user that has been designated as an identifier for the conference service from the response received from the TAS. The processor may be configured to generate instructions that specify the PUI of the user that is to be designated as an identifier for the conference service, and the transmitter may then be further configured to send the instructions to the TAS.

The processor may be configured to communicate with the TAS in order to establish one or more conference rules that are to be used to determine if a call directed to the PUI of the user that has been designated as an identifier for the conference should be connected to the conference hosted by the TAS.

The processor may be configured to initiate a call directed to the designated PUI in order to join the conference. Alternatively, the processor may be configured to initiate a call directed to a short number or supplementary service code that the TAS will interpret as a request to join the conference hosted by the TAS for the user.

BRIEF DESCRIPTION OF THE DRAWINGS

Aspects of the present invention will now be further described, by way of example only, with reference to the accompanying figures.

DETAILED DESCRIPTION

There will now be described methods and apparatus for implementing a conference call for a user of an IP Multimedia Subsystem (IMS). According to these methods, a conference service is identified by a Public User Identity (PUI) of a user that creates a conference, such that the conference service can be provided by the IMS Telephony Application Server (TAS) or Multimedia Telephony AS (MMTel AS) that provides multimedia telephony and supplementary services to the user, rather than a dedicated conferencing AS. A conference service can therefore be invoked in the same way as any other terminating service implemented for calls directed to the user.

Therefore, it is proposed herein that the TAS that provides IMS multimedia telephony and supplementary services to the user is configured to receive a request for a conference from a UE of the user, and to designate/assign a Public User Identity (PUI) of the user as an identifier for the conference service. Subsequently, upon receipt of signalling relating to a call intended for the user, the TAS will use the designated PUI of the user (i.e. the conference service PUI) to determine if the call can be connected to a conference hosted by the TAS for the user.

By providing that a conference service providing a conference for a user can be identified by a designated PUI of that user, the methods and apparatus described herein provide that the conference service can be implemented by the TAS/MMTel AS serving the user, thereby removing the need for dedicated conferencing AS within the IMS, and overcoming the capacity and scalability problems associated with the conventional implementation of conference services in large systems. Moreover, by providing that the conference service can be implemented by the TAS/MMTel AS in the same way as any other telephony service, the methods and apparatus described herein also allows for a straightforward integration of the conference service with the existing telephony/supplementary services provided by the TAS/MMTel AS, such as Communication Diversion (CDIV), Communication Barring (CB), etc. In particular, by providing that the conference service can be implemented by the TAS/MMTel AS, the methods and apparatus described herein provide that the rules defined for the supplementary service implemented by the TAS/MMTel AS can include conditions that relate to the current state of a conference created by the user. It should be understood that the terms "TAS" and "MMTel As" may be used interchangeably, and reference to a TAS or MMTel AS herein should be construed as a reference to a TAS and/or MMTel AS.

The step of using the designated PUI to determine if the call can be connected to a conference hosted by the TAS for the user will involve the TAS determining if the call is directed to the designated PUI. If it is determined that the call is directed to the designated PUI, then the TAS may determine that the call should be connected to the conference and connect the call accordingly. However, the TAS may also be configured to require that a calling user who wishes to join a conference enter at least one code before connecting the call to the conference. For example, whilst the designated PUI identifies the conference service, the TAS may require that a calling user provide a conference code in order to identify the particular conference instance. In addition, or as an alternative, the TAS may require that a calling user provide an access or pass code in order to confirm that the calling user is allowed to join the conference (e.g. has been invited by the user who created the conference). This may involve the user communicating with the TAS during the conference creation in order to establish one or more codes that should be entered by a user that wants to join the conference.

Whilst an individual conference code and/or an individual access code could be required in order to connect to a conference, such that the same conference code and/or access code is then being provided to all users invited to join the conference, multiple conference codes and/or multiple access codes can be defined for a particular conference instance with each of these multiple codes then being provided to one or more of the users that are invited to join the conference. For example, each user that is invited to join a conference instance could be provided with a unique conference code and/or a unique access code that can therefore serve as a means for identifying who has joined the conference.

Furthermore, if the user has communicated with the TAS in order to establish one or more conference rules, wherein a rule is matched if the one or more conditions of that rule are met, then the TAS will also be required to use these conference rules to determine if a call directed to the designated PUI should be connected to the conference. For example, each of these conference rules can specify conditions for the conference, such as the start time, end time, pre-defined allowed participants, access codes etc.

In this regard, each of the conference rules established for the conference can specify one or more conditions that must be met by a call in order for that call to match the rule. When a rule is matched, an associated action is implemented, such that each conference rule will include conditions that must be met in order for a call to be connected to a conference. For example, a conference rule for a scheduled conference will typically specify a start and end time for the conference, such that a call can only be connected to the call during the period bounded by the start and end times. By way of further example, a conference rule may specify the identities of other users that are allowed direct access to the conference. As such, if it is determined that a call is from one of the identified users, then the condition is met and the call will be connected to the conference. Alternatively, or in addition, the conference rules may be used to implement the requirement that a conference code and/or access code is provided by a caller before a call is connected to a conference.

In addition to the above examples, a conference rule may specify that a caller provide a conference service indication, which specifically indicates that the call directed to the designated PUI is intended to be connected to the conference. In this regard, a conference rule could specify that the signalling relating to the call includes a conference service indication. For example, signalling relating to the call could be required to include a SIP header information element or a specifically defined feature tag that indicates that the call directed to the designated PUI relates to a conference. Alternatively, the TAS could be configured to send a separate query to a calling user, requesting that they respond with an indication as to whether or not they wish to join the conference. In this case, the conference rule would only be matched if the calling user responded with an indication that they do wish to join the conference. If the user responded with an indication that they do not wish to join the conference, then the call should be handled as a standard one-to-one call to the user. These are only examples, and each conference rule could include a combination of any of these conditions. Moreover, the conference rules can also define the attributes of the conference, such as the permitted media types, floor control policy, privacy policy etc.

The step of using the conference rules to determine if the call should be connected to the conference will then typically involve the TAS determining if the call matches at least one of the conference rules. If it is determined that a call directed to the designated PUI matches at least one of the conference rules, then the TAS may determine that the call should be connected to the conference and connect the call accordingly. Of course, it is possible that a single call could match more than one rule.

If it is determined that the call is not directed to the designated PUI, then the TAS will determine that the call cannot be connected to the conference. Similarly, if there are conference rules defined for the conference, and it is determined that a call that is directed to the designated PUI does not match at least one of these conference rules, then the TAS can determine that the call cannot be connected to the conference. In either case, when it is determined that the call cannot be connected to the conference, the TAS may be further configured to determine if any of the supplementary services supported by the TAS should be applied to the call. For example, the TAS can use supplementary service rules specified for the Communication Diversion (CDIV) and Communication Barring (CB) services to determine if the call should be blocked or diverted (e.g. to a voicemail service).

Similarly, if the TAS receives signalling that is directed to another PUI of the user (i.e. other than the PUI designated as an identifier for the conference), then the TAS can be configured to determine if any supplementary services supported by the TAS should be applied to the call. Furthermore, the supplementary service rules may include rules that specifically relate to the conference. For example, a supplementary service rule could be defined for the Communication Barring (CB) service, wherein the rule specifies that calls towards the designated PUI of the conference, but that are received outside of the scheduled start/end time of the conference, are to be barred.

The step of designating a PUI of the user as an identifier for the conference service can involve the TAS receiving instructions from the user that specify a PUI that is to be used to identify the conference service. Alternatively, the TAS may automatically designate the PUI of the user that is included in the received request for a conference as the identifier for the conference service. As a further alternative, the TAS may be configured to identify a PUI of the user that has been pre-configured as the designated PUI for the user.

In this regard, the PUI used to identify the conference service can be any PUI that is associated with the user. In particular, a user may have more than one PUI allocated to them, and may therefore select any one of this plurality of PUIs when creating a conference. For example, the user may have a first PUI that is used for work related matters only and a second PUI that is used for personal matters, and may therefore select the first PUI for a work-related conference. The TAS will then be instructed to designate the PUI selected by the user as the identifier for the conference service. Alternatively, it is also possible that TAS could be configured to obtain the PUI of the user from the request received from the user, and to automatically designate this PUI as the conference service identifier. As a further alternative, the user could have a PUI that is reserved/dedicated for use as the designated PUI that identifies a conference service provided by the TAS for the user. The TAS could then be pre-configured with this PUI, and automatically designate this PUI as the conference service identifier when the user requests creation of a conference. For example, this designated PUI could be stored within the user's subscriber profile that can be retrieved from the HSS.

The conference rules that may be established for a conference are particularly useful in circumstances in which the user does not have a pre-configured conference PUI that is dedicated to identifying a conference service. In such circumstances, one of the PUIs of the user that is conventionally used to route incoming calls to the user will be designated as the conference service PUI. The conference rules can then be used to distinguish between calls directed to the designated PUI that are from callers that intend to participate in the conference (e.g. by defining a direct access list, access code etc), and calls directed to the designated PUI that are from callers that merely intended to place a one-to-one call. Of course, the conference rules could specify that all callers to the designated PUI are allowed to join the conference.

Figure 2:
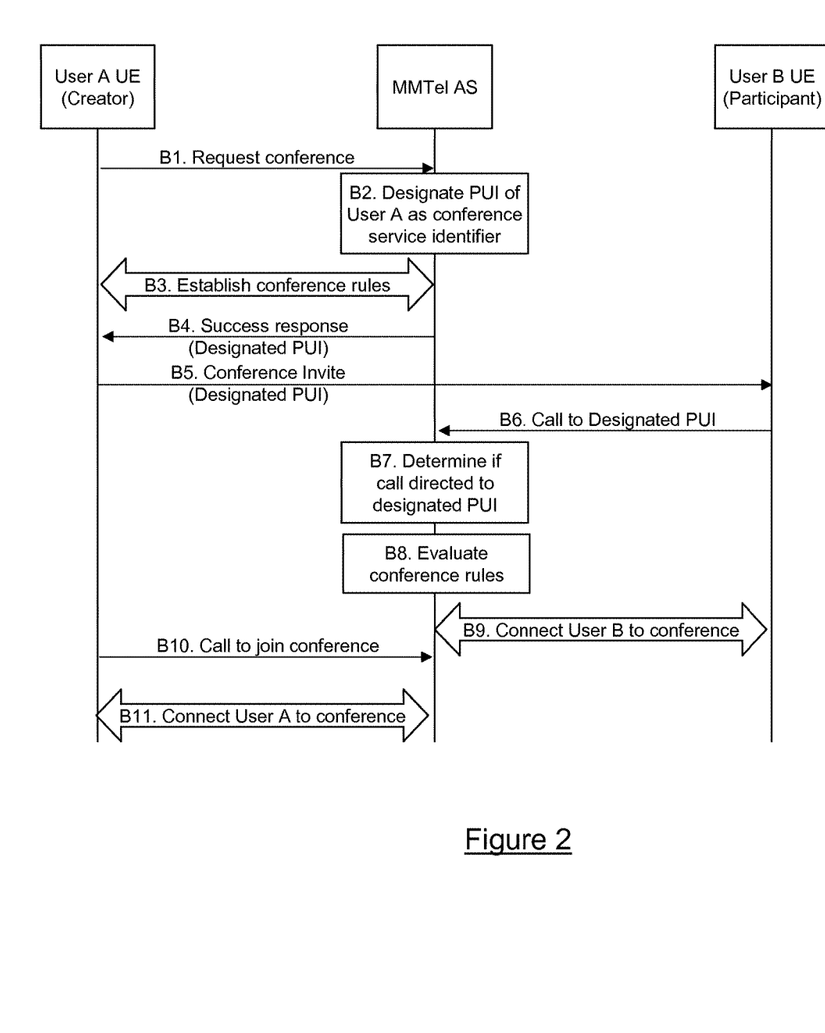
FIG. 2 is a signalling flow diagram illustrating a first example of the process of implementing a conference according to the methods described herein.

FIG. 2 is a signalling flow diagram illustrating an example of the process of implementing a scheduled conference according to the methods described herein. The steps performed are as follows:

B1. User A makes use of their UE to send a request for a conference to the TAS that provides supplementary services to the user.

B2. The TAS then designates a PUI of User A as an identifier for the conference service. For example, the request from User A could have specified a PUI that is to be used to identify the conference. Alternatively, the TAS could automatically designate the PUI of User A that is received in the request. As a further alternative, the TAS could identify a pre-configured PUI of User A that is dedicated for use as a conference identifier.

B3. The TAS also interacts/cooperates with the UE in order to establish conference rules that are to be used to determine if a call directed to the designated PUI can be connected to the conference. For example, if the TAS could provide a dashboard/control panel interface to the UE that allows the user to configure the conference rules relating to the conference.

B4. The TAS confirms to the UE when the conference has been successfully arranged/organised, and includes the designated PUI that is to be used as an identifier for the conference service.

B5. User A decides to invite User B to be a participant in the conference. User A therefore sends a conference invite to User B, including the designated PUI that identifies the conference service. If required, User A will also communicate any conference code and/or access code that User B will require in order to access the conference. Whilst this step is illustrated as signalling between the UE of User A and the UE of User B, this step may be performed by other means, provided that User B is made aware of the designated PUI. For example, User A could communicate the designated PUI in person, verbally over the telephone, or by any other communication means.

B6. After receiving the conference invite from User A, and after the start time of the scheduled conference, User B decides to join the scheduled conference. User B therefore makes use of their UE to implement a call directed to the designated PUI of user A, the designated PUI having been obtained from User A.

B7. As the call is directed to a PUI of User A, the IMS routes the call to the TAS that provides supplementary services to the user (i.e. due to the evaluation of the User A's initial Filter Criteria (iFC) by the terminating S-CSCF). The TAS therefore receives the signalling for this call, and uses the designated PUI to determine if the call can be connected to a conference hosted by the TAS for the user.

B8. In this example, the call from User B is directed to the designated PUI, and the TAS therefore determines that the call may be intended to as an attempt to join the conference created by User A. Given that conference rules have been established for the conference, the TAS evaluates the conference rules in order to determine if the call should be connected to the conference.

B9. In this example, the call from User B matches at least one of the conference rules and is therefore connected to the conference.

B10. After the start time of the scheduled conference, User A also decides to join the scheduled conference. To do so, User A can make use of their UE to implement a call directed to the designated PUI. Alternatively, User A can make use of their UE to implement a call to a predefined short number or supplementary service code that the TAS is configured to interpret as a request to join the conference.

B11. The TAS recognises that this call originates from User A and relates to the scheduled conference. The TAS therefore connects User A to the conference.

Figure 3A:
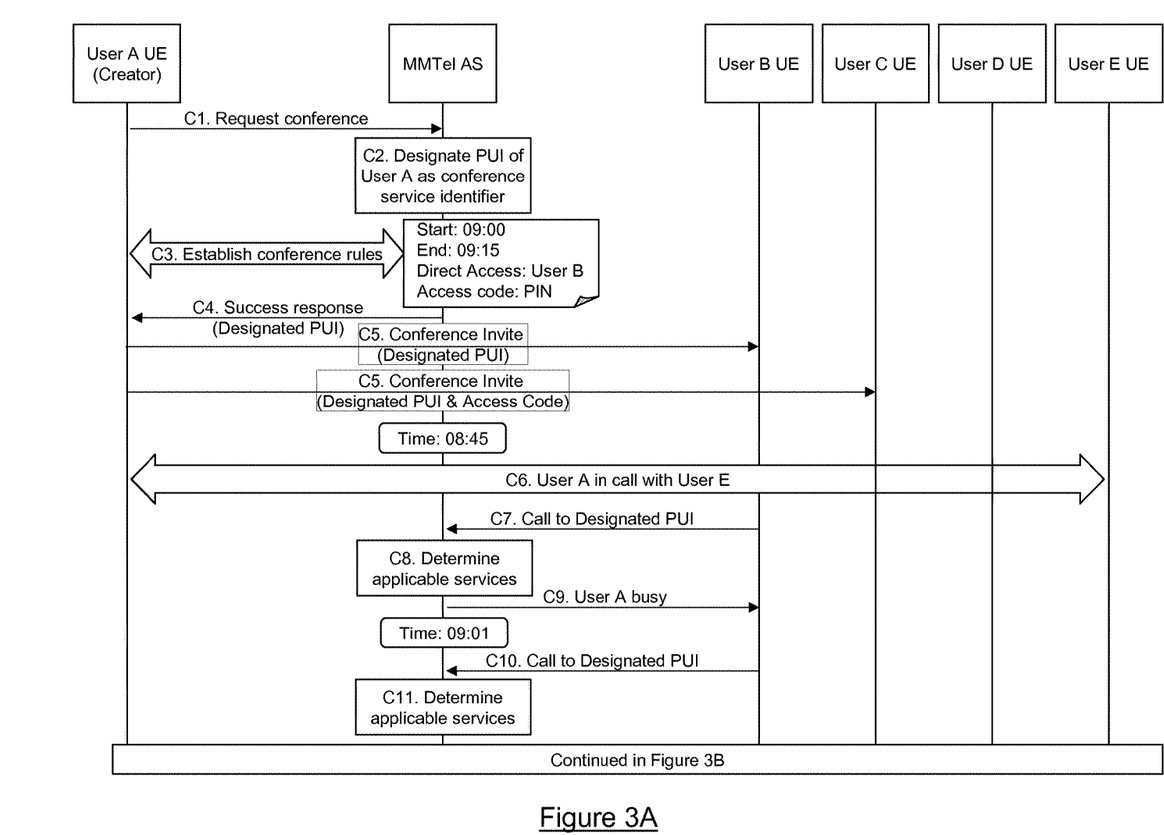
FIGS. 3A and 3B are signalling flow diagrams illustrating a second example of the process of implementing a conference according to the methods described herein.
Figure 3B:
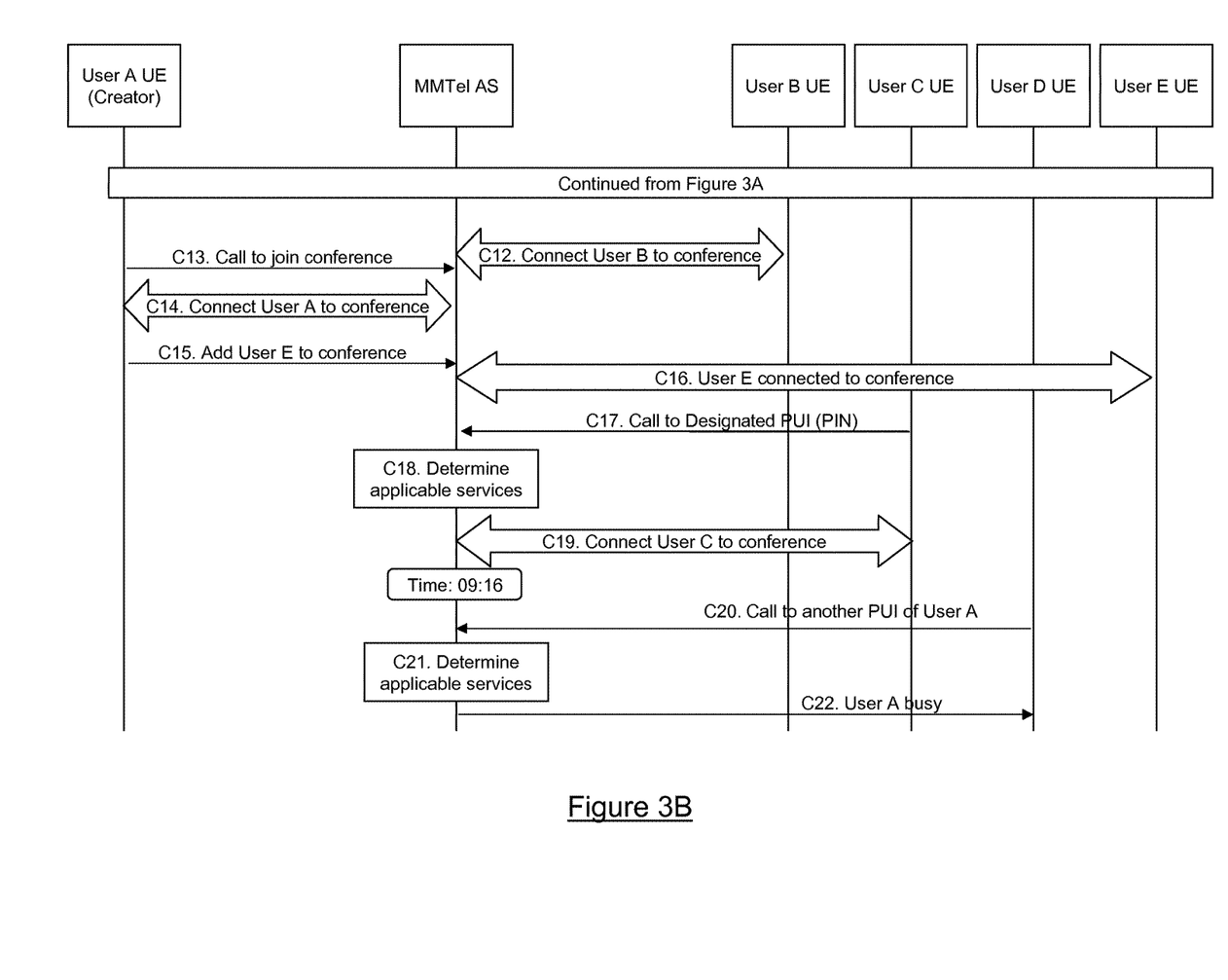

FIGS. 3A and 3B are signalling flow diagrams illustrating a more detailed example of the process of implementing a scheduled conference, and the integration of the scheduled conference with other supplementary services, according to the methods described herein. The steps performed are as follows:

C1. User A makes use of their UE to send a request for a conference to the TAS/MMTel AS that provides supplementary services to the user.

C2. The TAS then designates a PUI of User A as an identifier for the conference service. For example, the request from User A could have specified a PUI that is to be used to identify the conference service, and the TAS would then designate the specified PUI as an identifier for the conference service. Alternatively, the TAS could automatically designate the PUI of User A that is received in the request. As a further alternative, the TAS could identify a pre-configured PUI of User A that is dedicated for use as a conference service identifier.

C3. The TAS also interacts/cooperates with the UE in order to establish conference rules that are to be used to determine if a call directed to the selected PUI can be connected to the conference. In this example, the established conference rules define a start time for the conference of 09:00, an end time for the conference of 09:15, an access code for the conference, and a pre-established list of participants that are allowed direct access to the conference (e.g. without the need to enter an access code) that identifies another user, User B.

C4. The TAS confirms to the UE when the conference has been successfully arranged/organised, and includes the designated PUI that is to be used as an identifier for the conference service.

C5. User A decides to invite User B and User C to be participants in the conference. User A therefore sends conference invites to User B and User C, including the designated PUI that identifies the conference service. Whilst this step is illustrated as signalling between the UE of User A and the UEs of User B and User C, this step may be performed by other means, provided that User B is made aware of the designated PUI and User C is made aware of the designated PUI and the access code. For example, User A could communicate the designated PUI and/or access code in person, verbally over the telephone, or by any other communication means.

C6. Before the start time of the scheduled conference, User A becomes involved in a call with User E.

C7. User B then attempts to make a call to User A using the designated PUI.

C8. As the call is directed to a PUI of User A, the IMS routes the call to the TAS that provides supplementary services to the user. The TAS therefore receives the signalling for this call, and uses the designated PUI to determine that the call may relate to a conference hosted by the TAS for the user. Consequently, the TAS proceeds to evaluate the conference rules. As it is not yet time for the scheduled conference, the TAS determines that the call should not be connected to the conference. The TAS therefore also evaluates the rules defined for the user's other supplementary services, which may include supplementary service rules that specifically relate to conference calls.

C9. In this example, the TAS determines that User A is already participating in a call and can therefore divert the call from User B to a voicemail service, bar the call, and/or provide a call waiting indication to User A, etc, depending upon the result of the evaluation of the user's supplementary service rules.

C10. After the start time of the scheduled conference, User B again attempts a call directed to the designated PUI.

C11. As the call is directed to the designated PUI of User A, the IMS routes the call to the TAS that provides supplementary services to the user, and the TAS evaluates the conference rules.

C12. As it is now within the time period specified for the scheduled conference, and the call is from a user identified on the direct access list, the TAS determines that the call should be connected to the conference. The TAS therefore connects User B to the conference.

C13. User A also decides to join the scheduled conference. User A therefore puts the ongoing call with User E on hold, and calls to join the conference. To join the conference, User A can use their UE to implement a call directed to the designated PUI. Alternatively, User A can use their UE to implement a call to a predefined short number or supplementary service code that the TAS is configured to interpret as a request to join the conference.

C14. The TAS recognises that this call originates from User A and relates to the scheduled conference. The TAS therefore connects User A to the conference.

C15. User A then decides to add User E, with whom they are already participating in a one-to-one call, to the scheduled conference.

C16. The TAS therefore connects User E to the conference.

C17. User C then attempts to make a call to User A using the designated PUI, and sends the access code established for the conference to the TAS. Whilst this step illustrates the access code (e.g. PIN) as being included in the call directed to the designated PUI, this could also be provided to the TAS following receipt of a response from the TAS, the response requesting that the user input the access code in order to access the conference.

C18. As the call is directed to the designated PUI of User A, the IMS routes the call to the TAS that provides supplementary services to the user, and the TAS evaluates the conference rules.

C19. As it is now within the time period specified for the scheduled conference, and the caller has provided the access code for the conference, the TAS determines that the call should be connected to the conference. The TAS therefore connects User C to the conference.

C20. After the end time of the scheduled conference, User D attempts a call directed to another PUI of User A (i.e. other than the designated PUI).

C21. As the call is directed to a PUI of User A, the IMS routes the call to the TAS that provides supplementary services to the user. However, as the call is not directed to the designated PUI, and it is now beyond the time period specified for the scheduled conference, the TAS determines that the call should not be connected to the conference.

C22. The TAS therefore evaluates the rules defined for the user's other supplementary services. In this example, the TAS determines that User A is still participating in the conference call and can therefore divert the call from User D to a voicemail service, bar the call, and/or provide a call waiting indication to User A, etc, depending upon the result of the evaluation of the user's supplementary service rules.

Figure 4:
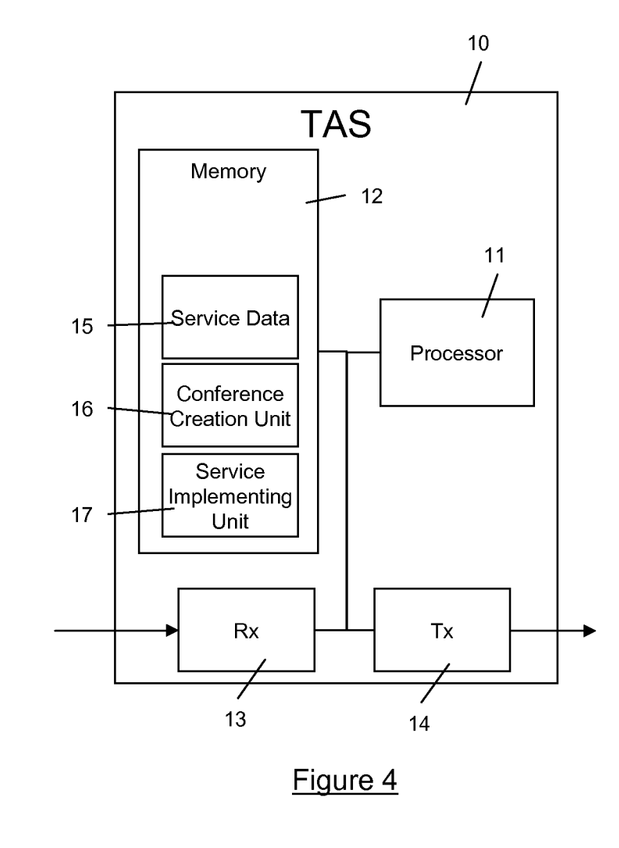
FIG. 4 illustrates schematically an example of a TAS/MMTel AS suitable for implementing the methods described herein.

FIG. 4 illustrates schematically an example of a TAS/MMTel AS 10 suitable for implementing a conference service in accordance with the methods described. The TAS 10 can be implemented as a combination of computer hardware and software. The TAS 10 comprises a processor 11, a memory 12, a receiver 13 and a transmitter 14. The memory 12 stores the various programs/executable files that are implemented by the processor 11, and also provides a storage unit for any required data. For example, the data stored by the memory 12 can include but is not limited to the service data 15 associated with the supplementary services provided to the user, including the supplementary service rules etc. The programs/executable files stored in the memory 12, and implemented by the processor 11, include but are not limited to a conference creation unit 16 and a servicer implementing unit 17.

Figure 5:
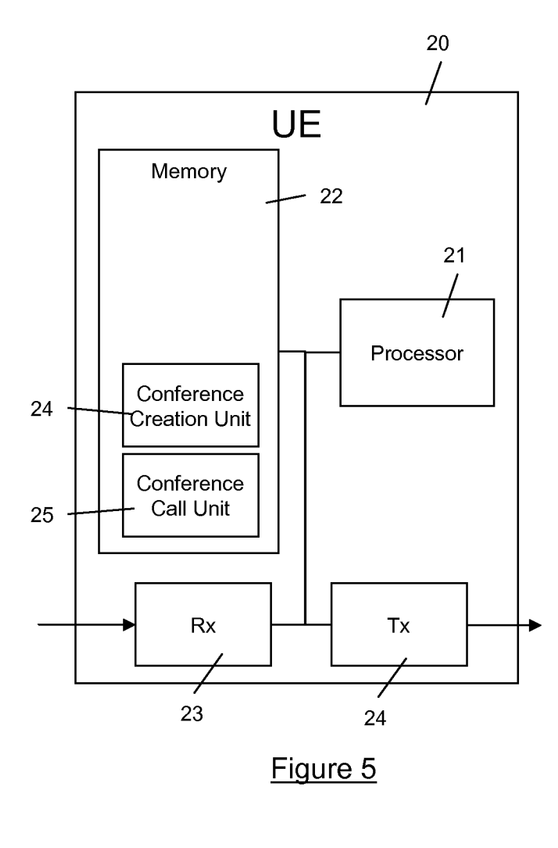
FIG. 5 illustrates schematically an example of a UE suitable for implementing the methods described herein.

FIG. 5 illustrates schematically an example of a UE 20 suitable for implementing a conference service in accordance with the methods described. The UE 20 can be implemented as a combination of computer hardware and software. The UE 20 comprises a processor 21, a memory 22, a receiver 23 and a transmitter 24. The memory 22 stores the various programs/executable files that are implemented by the processor 21, and also provides a storage unit for any required data. The programs/executable files stored in the memory 22, and implemented by the processor 21, include but are not limited to a conference creation unit 24 and a conference call unit 25.

The service data for the conference service is stored at the HSS within the transparent data of the user's subscriber profile, in the same way as service data for any other supplementary service provided by the TAS/MMTel AS. Of course, the service data for the conference service could be stored at any other service data storage entity. The service data for the conference service can include the designated PUI, the conference rules, and any attributes for conference. The service data may also include personal recorded multimedia announcements to be used by an Interactive Voice Response (IVR) function that can be used to provide the interaction between a user and the TAS/MMTel AS when creating and/or attempting to join a conference.

It will be appreciated by the person of skill in the art that various modifications may be made to the above-described embodiments without departing from the scope of the present invention. For example, whilst the example embodiments described above relate to the implementation of a scheduled conference, the use of a PUI of a user to identify a conference, such that the conference service can be provided by the TAS or MMTel AS that provides multimedia telephony and supplementary services to the user, is equally applicable to ad-hoc conferences that are created on-the-fly by the user.

The invention claimed is:

1. A method of implementing a conference for a user of an Internet Protocol (IP) Multimedia Subsystem (IMS), the method comprising:
   at a Telephony Application Server (TAS) that provides IMS multimedia supplementary services to the user:
   receiving a request for a conference from the user, the request comprising a Public User Identity (PUI) of the user to be designated and used as a conference identifier for a conference service provided by the TAS that is to host the conference for the user;
   designating the received PUI of the user as the conference identifier for the conference service;
   receiving from another user signalling containing a PUI relating to a call intended for the user;
   upon determining that the PUI relating to the call intended for the user is the designated PUI, using the designated PUI to determine whether the call is to be connected to the conference hosted by the TAS;
   communicating with the user in order to establish one or more conference rules that are to be used to determine whether a call directed to the designated PUI is be connected to the conference;
   wherein the step of using the designated PUI to determine whether the call is to be connected to the conference hosted by the TAS for the user further comprises:
   based on the determination that the call is directed to the designated PUI, determining whether the call matches at least one of the conference rules;
   wherein based on the determination that the call does not match at least one of the one or more conference rules, determining that the call cannot be connected to the conference, and determining whether any of the supplementary services supported by the TAS are to be applied to the call; and,
   wherein the TAS invokes the conference service in a same away as any other terminating service implemented for calls directed to the user, and wherein the TAS is not a dedicated conference application server but rather the TAS provides the IMS multimedia supplementary services and the conference service to the user.

2. The method as claimed in claim 1, and further comprising:
   establishing supplementary service rules, one or more of the supplementary service rules include conditions that relate to the conference; and
   using the supplementary service rules to determine whether any of the supplementary services supported by the TAS should be applied to the call.

3. The method as claimed in claim 1, wherein the step of using the designated PUI to determine whether the call is to be connected to the conference hosted by the TAS further comprises:
   based on the determination that the call is directed to the designated PUI, determining whether the call includes a conference service indication that indicates the call is intended to be connected to the conference.

4. The method as claimed in claim 1, further comprising:
   based on the determination that the call cannot be connected to the conference, determining whether any of the supplementary services supported by the TAS are to be applied to the call.

5. An apparatus configured to operate as an Internet Protocol (IP) Multimedia Subsystem (IMS) Telephony Application Server (TAS) that provides IMS supplementary services to a user, the apparatus comprising:
   a receiver configured to receive a request for a conference from the user, the request comprising a Public User Identity (PUI) of the user to be designated and used as a conference identifier for a conference service provided by the TAS that is to host the conference for the user;
   a processor configured to designate the PUI of the user as the conference identifier for the conference service;
   the receiver being further configured to receive from another user signalling containing a PUI relating to a call intended for the user;
   the processor being further configured where upon determining that the PUI relating to the call intended for the user is the designated PUI, to use the designated PUI to determine whether the call is to be connected to the conference hosted by the TAS;
   the processor is configured to communicate with the user to establish one or more conference rules that are to be used to determine whether a call directed to the designated PUI is to be connected to the conference;
   the processor when using the designated PUI to determine whether the call is to be connected to the conference hosted by the TAS for the user is further configured based on the determination that the call is directed to the designated PUI to determine whether the call matches at least one of the conference rules;
   the processor based on the determination that the call does not match at least one of the conference rules is configured to:
   determine that the call cannot be connected to the conference; and
   determine whether any of the supplementary services supported by the TAS are to be applied to the call; and
   wherein the TAS invokes the conference service in a same away as any other terminating service implemented for calls directed to the user, and wherein the TAS is not a dedicated conference application server but rather the TAS provides the IMS multimedia supplementary services and the conference service to the user.

6. The apparatus as claimed in claim 5, wherein the processor is configured to establish supplementary service rules, wherein one or more of the supplementary service rules include conditions that relate to the conference, and to use the supplementary service rules to determine whether any of the supplementary services supported by the TAS are to be applied to the call.

7. The apparatus as claimed in claim 5, wherein based on the determination that the call is directed to the designated PUI, the processor is configured to determine whether the call includes a conference service indication that indicates the call is intended to be connected to the conference.

8. The apparatus as claimed in claim 5, wherein, based on the determination that the call cannot be connected to the conference, the processor is configured to:

determine whether any of the supplementary services supported by the TAS are to be applied to the call.

9. The apparatus as claimed in claim 5, wherein the processor is configured to designate the PUI of the user as an conference identifier for the conference service in accordance with instructions from the user that specify the designated PUI.

\* \* \* \* \*